US007594263B2

(12) United States Patent
Boulanger et al.

(10) Patent No.: US 7,594,263 B2
(45) Date of Patent: *Sep. 22, 2009

(54) OPERATING A COMMUNICATION NETWORK THROUGH USE OF BLOCKING MEASURES FOR RESPONDING TO COMMUNICATION TRAFFIC ANOMALIES

(75) Inventors: Alan Boulanger, Amherst, MA (US); Kevin Himberger, Raleigh, NC (US); Clark D. Jeffries, Durham, NC (US); John Ziraldo, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1136 days.

This patent is subject to a terminal disclaimer.

(21) Appl. No.: 10/774,017

(22) Filed: Feb. 5, 2004

(65) Prior Publication Data
US 2005/0177872 A1    Aug. 11, 2005

(51) Int. Cl.
H04L 9/32 (2006.01)
G06F 11/00 (2006.01)
G06B 23/00 (2006.01)

(52) U.S. Cl. .............................. 726/16; 726/11; 726/22; 726/23; 726/24; 709/223; 709/224; 709/225; 709/226

(58) Field of Classification Search ............. 726/11–15, 726/22–25; 709/223–226; 370/235
See application file for complete search history.

(56) References Cited

U.S. PATENT DOCUMENTS

| 5,826,014 | A |   | 10/1998 | Coley et al. ............ 395/187.01 |
|---|---|---|---|---|
| 5,835,726 | A | * | 11/1998 | Shwed et al. ............... 709/229 |
| 5,850,516 | A | * | 12/1998 | Schneier ....................... 726/25 |
| 5,958,010 | A |   | 9/1999 | Agarwal et al. ............. 709/224 |
| 6,006,329 | A | * | 12/1999 | Chi ............................... 726/24 |
| 6,044,402 | A | * | 3/2000 | Jacobson et al. ............ 709/225 |
| 6,061,798 | A |   | 5/2000 | Coley et al. ................. 713/201 |
| 6,304,975 | B1 |   | 10/2001 | Shipley ....................... 713/201 |
| 6,345,299 | B2 |   | 2/2002 | Segal .......................... 709/229 |
| 6,363,477 | B1 | * | 3/2002 | Fletcher et al. ............. 713/151 |

(Continued)

FOREIGN PATENT DOCUMENTS

JP    2002073433    3/2002

OTHER PUBLICATIONS

Labuschagne et al. "Activating Dynamic Countermeasures to Reduce Risk," *Information System Security—Facing the Information Society of the 21st Century*, 1996.

(Continued)

Primary Examiner—Ayza R Sheikh
Assistant Examiner—Trang Doan
(74) Attorney, Agent, or Firm—Dillion & Yudell LLP

(57) ABSTRACT

A communication network is operated by detecting an anomaly in the communication traffic at a plurality of nodes in a communication network. A first blocking measure A is independently applied at respective ones of the plurality of nodes to the anomalous traffic that stops the anomalous traffic. A second blocking measure B is independently determined at the respective ones of the plurality of nodes such that application of a logical combination of the first blocking measure A and the second blocking measure B to the anomalous traffic stops the anomalous traffic.

27 Claims, 5 Drawing Sheets

U.S. PATENT DOCUMENTS

| | | | |
|---|---|---|---|
| 6,484,203 B1 | 11/2002 | Porras et al. | 709/224 |
| 6,499,107 B1 | 12/2002 | Gleichauf et al. | 713/201 |
| 6,519,703 B1 | 2/2003 | Joyce | 713/201 |
| 6,546,493 B1 | 4/2003 | Magdych et al. | 713/201 |
| 6,550,012 B1 | 4/2003 | Villa et al. | 713/203 |
| 6,609,205 B1* | 8/2003 | Bernhard et al. | 726/22 |
| 6,738,814 B1 | 5/2004 | Cox et al. | 709/225 |
| 7,049,933 B1* | 5/2006 | Koerner | 340/10.1 |
| 7,124,438 B2* | 10/2006 | Judge et al. | 726/22 |
| 7,272,646 B2* | 9/2007 | Cooper et al. | 709/223 |
| 2002/0101819 A1* | 8/2002 | Goldstone | 370/229 |
| 2002/0107953 A1 | 8/2002 | Ontiveros et al. | 709/224 |
| 2002/0178383 A1 | 11/2002 | Hrabik et al. | 713/201 |
| 2003/0004689 A1* | 1/2003 | Gupta et al. | 702/188 |
| 2003/0018914 A1 | 1/2003 | Cheng et al. | 713/203 |
| 2003/0023708 A1* | 1/2003 | Jung | 709/221 |
| 2003/0065943 A1* | 4/2003 | Geis et al. | 713/201 |
| 2003/0084326 A1* | 5/2003 | Tarquini | 713/200 |
| 2003/0097589 A1 | 5/2003 | Syvanne | 713/201 |
| 2003/0097590 A1 | 5/2003 | Syvanne | 713/201 |
| 2004/0064737 A1* | 4/2004 | Milliken et al. | 713/201 |

OTHER PUBLICATIONS

Labuschagne et al. "The Use of Real-Tim Risk Analysis to Enable Dynamic Activation of Countermeasures," *Computers and Security*, May 1998.

Sekar et al. "On Preventing Intrusions by Process Behavior Monitoring," *Proc. of the Workshop on Intrusion Detection and Network Monitoring*, 1999.

Balasubramaniyan et al. "An Architecture for Intrusion Detection Using Autonomous Agents," *COAST Technical Report*, COAST Laboratory, Purdue University, Jun. 11, 1998.

"Mitigating the SANS/FBI Top Twenty with Check Point Software Technologies," Check Point Software Technologies Ltd., 2003.

Dasgupta, Dipankar, "Immunity-Based Intrusion Detection System: A General Framework," *Proc. 22nd National Information Systems Security Conference*, 1999.

Perrochon et al. "Enlisting Event Patterns for Cyber Battlefield Awareness," *Proc. DARPA Information Survivability Conference and Exposition*, 1999.

Staniford et al. "Practical Automated Detection of Stealthy Portscans," *Journal of Computer Security*, 2002.

Lindquist et al., "eXpert-BSM: A Host-Based Intrusion Detection Solution for Sun Solaris," *Proc. of the 17th Annual Computer Security Applications Conference, IEEE Computer Society*, 2001.

Newman et al. "Intrusion Detection Systems Suspicous Finds," *Data Communications*, vol. 27, No. 11, Aug. 1998, pp. 72-82.

Forte, Dario, "Guaranteeing the Safety of a Network Beyond the Firewall," *Networks Security*, Sep. 1998, pp. 12-16.

Wood, Charles Cresson, "Logging, Auditing and Filtering for Internet Electronic Commerce," *Computer Fraud and Security*, Aug. 1997, pp. 11-6.

Marcinkevič, M. "Skaitmeninès televizijos tinklu pletra Lietuvoje," *Elektronika Ir Elektrotechnika (Electronics and Electrical Engineering)*, No. 6 (41), 2002, pp. 72-75.

International Search Report and Written Opinion of the International Searching Authority for International patent application No. PCT/EP2005/05194 mailed on Jun. 8, 2005.

US 6,542,592, 04/2003, Heilmann et al. (withdrawn)

* cited by examiner

OPERATING A COMMUNICATION NETWORK THROUGH USE OF BLOCKING MEASURES FOR RESPONDING TO COMMUNICATION TRAFFIC ANOMALIES

BACKGROUND OF THE INVENTION

The present invention relates to communication networks, and, more particularly, to processing traffic anomalies in communication networks.

Communication networks are susceptible to malicious attacks designed to degrade and/or disable their functionality. For example, communication networks may be targeted with denial of service attacks, viruses, worms, and/or other types of destructive mechanisms. In some networks, communication between certain nodes and/or subnets may be of increased importance. Unfortunately, attacks may involve the transmission of communication traffic through a network that is interspersed with large amounts of valid traffic. When anomalous traffic associated with an attack is detected, blocking all traffic to protect the network from the attack may, unfortunately, block significant amounts of valid traffic. Moreover, communication between certain nodes and/or subnets may be of such importance that blocking traffic between such entities should only be done as a last resort.

More specifically, a network operator may be faced with the following guidelines for managing a network. First, within a subnet, network administrators should be able to communicate with firewalls. Second, within a subnet, certain clients should be able to communicate with certain other clients and/or certain nodes or servers. Worms may be able to enter a subnet through Internet or Extranet firewalls using a legitimate destination port by design and/or by an Internet Protocol destination address by chance or design.

One or more factors may be used to identify anomalous traffic that may be indicative of an attack or propagation of a virus or worm. One factor may be that the arriving packet destination address values are randomly distributed values within the assigned subnet space, but are not the values appropriate to the machines within the subnet that support the application designated by the destination port. Another factor may be that the rate of packets arriving for the destination port is higher than normal. Ideally, an administrator may configure one or more firewalls to begin blocking some or all traffic with the foregoing characteristics. Unfortunately, human intervention is not always reliable, sufficiently fast, and/or even possible. Delayed intervention may result in the collapse of essential services within the subnet.

SUMMARY

According to some embodiments of the present invention, a communication network is operated by detecting an anomaly in the communication traffic at a plurality of nodes in a communication network. A first blocking measure A is independently applied at respective ones of the plurality of nodes to the anomalous traffic that stops the anomalous traffic. A second blocking measure B is independently determined at the respective ones of the plurality of nodes such that application of a logical combination of the first blocking measure A and the second blocking measure B to the anomalous traffic stops the anomalous traffic.

In other embodiments of the present invention, the second blocking measure B is determined by applying a logical combination of A and the second blocking measure B given by (A & !B) to the anomalous traffic where the logical combination (A & !B) is a less restrictive blocking measure than the logical combination (A & B). The logical combination (A & !B) is enforced if the logical combination (A & !B) stops the anomalous traffic.

In still other embodiments of the present invention, a third blocking measure C is independently determined at the respective ones of the plurality of nodes such that application of a logical combination of (A & !B) and the third blocking measure C to the anomalous traffic stops the anomalous traffic if the logical combination (A & !B) stops the anomalous traffic.

In still other embodiments of the present invention, the second blocking measure B is independently determined by applying a logical combination (A & B) to the anomalous traffic if the logical combination (A & !B) does not stop the anomalous traffic. The logical combination (A & B) is enforced if the logical combination (A & B) stops the anomalous traffic.

In still other embodiments of the present invention, a third blocking measure C is independently determined at the respective ones of the plurality of nodes such that application of a logical combination of (A & B) and the third blocking measure C, e.g., (A & B & C) to the anomalous traffic stops the anomalous traffic if the logical combination (A & B) stops the anomalous traffic.

In still other embodiments of the present invention, a third blocking measure C is determined at the respective ones of the plurality of nodes such that application of a logical combination of A and the third blocking measure C, e.g., (A & C) to the anomalous traffic stops the anomalous traffic if the logical combination (A & B) does not stop the anomalous traffic.

In further embodiments of the present invention, detecting an anomaly in the communication traffic comprises detecting a pattern in a value of at least one protocol field associated with the communication traffic.

In still further embodiments of the present invention, a severity is assigned to the detected anomaly. The first blocking measure A is applied to the anomalous traffic at each of the plurality of nodes in the communication network so as to stop or reduce the flow of the anomalous traffic based on the severity of the detected anomaly.

In still further embodiments of the present invention, the anomaly is intentionally inserted into the communication traffic for test purposes. The first blocking measure A and the second blocking measure B are associated with the anomaly.

In other embodiments of the present invention, a communication network is operated by detecting an anomaly in the communication traffic at a plurality of nodes in a communication network. A first blocking measure A is synchronously applied at respective ones of the plurality of nodes to the anomalous traffic that stops the anomalous traffic. A second blocking measure B is synchronously determined at the respective ones of the plurality of nodes such that application of a logical combination of the first blocking measure A and the second blocking measure B to the anomalous traffic stops the anomalous traffic.

Although described primarily above with respect to method aspects of the present invention, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
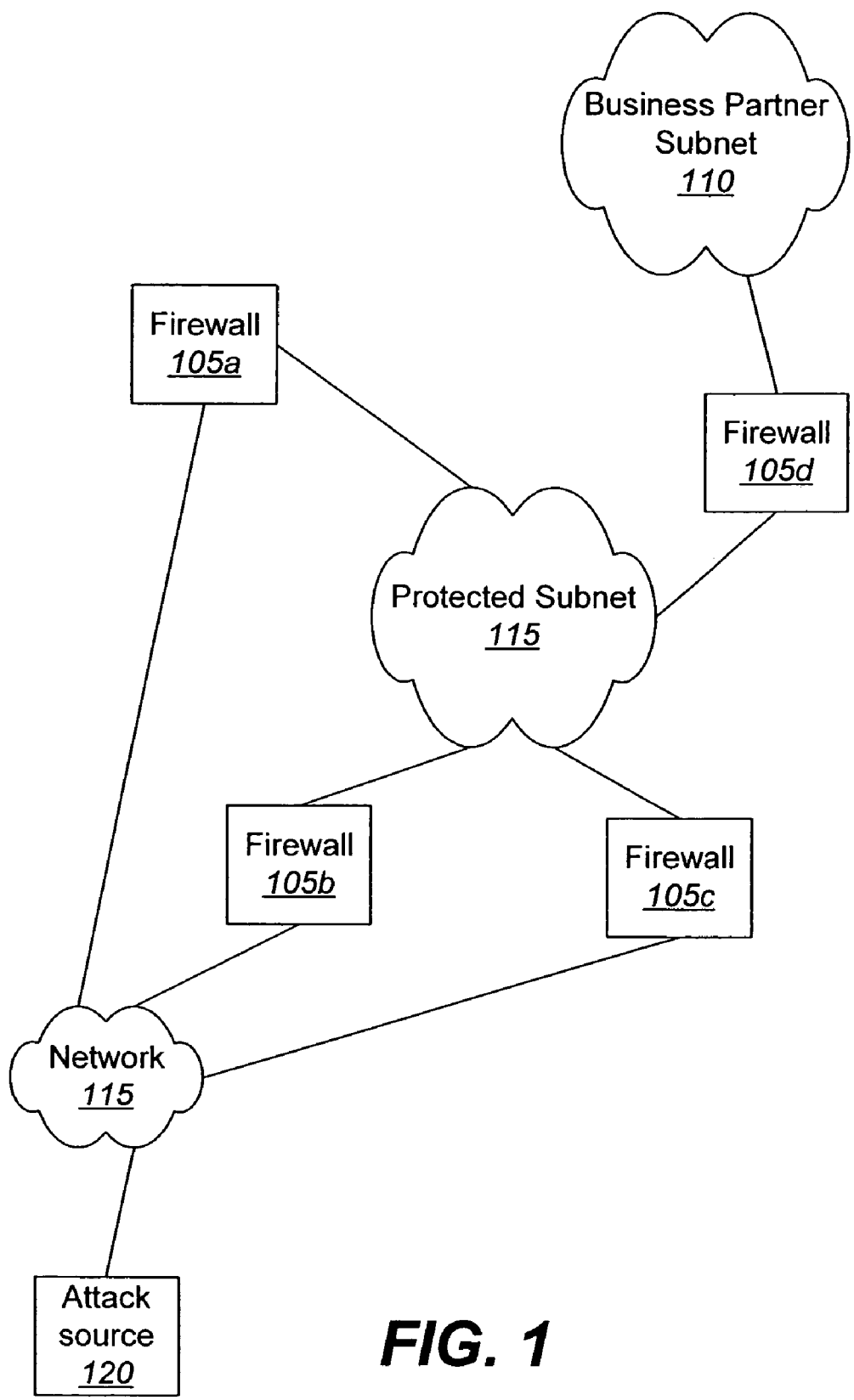
FIG. 1 is a block diagram that illustrates a communication network in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 is a block diagram that illustrates a communication network in accordance with some embodiments of the present invention. As shown in FIG. 1, the communication network comprises a protected subnet 100 that is protected by firewall data processing nodes 105a,b,c,d. The protected subnet may communicate with a business partner subnet 110 through firewall 105d. The protected subnet may also communicate with other data processing systems via network 115 through firewalls 105a,b,c. The network 115 may comprise, for example, the Internet, a wide area network, a local area network, and/or combinations of such networks. In accordance with some embodiments of the present invention, a computer, terminal, server, and/or other data processing system 120 may communicate with the network 115 and may be the source of malicious or anomalous traffic. Thus, data processing system 120 may be considered an attach source. It will be understood that data processing systems on the protected subnet 100 may communicate with many computers, servers, network nodes, data processing systems, network entities, etc. in accordance with various embodiments of the present invention. Moreover, these other computers, servers, nodes, systems, and/or entities may be the source of malicious communication traffic anomalies, which may be destructive to data processing systems on the protected subnet 100 and/or the protected subnet 100 itself.

Although FIG. 1 illustrates an exemplary communication network in accordance with some embodiments of the present invention, it will be understood that the present invention is not limited to such a configuration but is intended to encompass any configuration capable of carrying out operations described herein.

Figure 2:
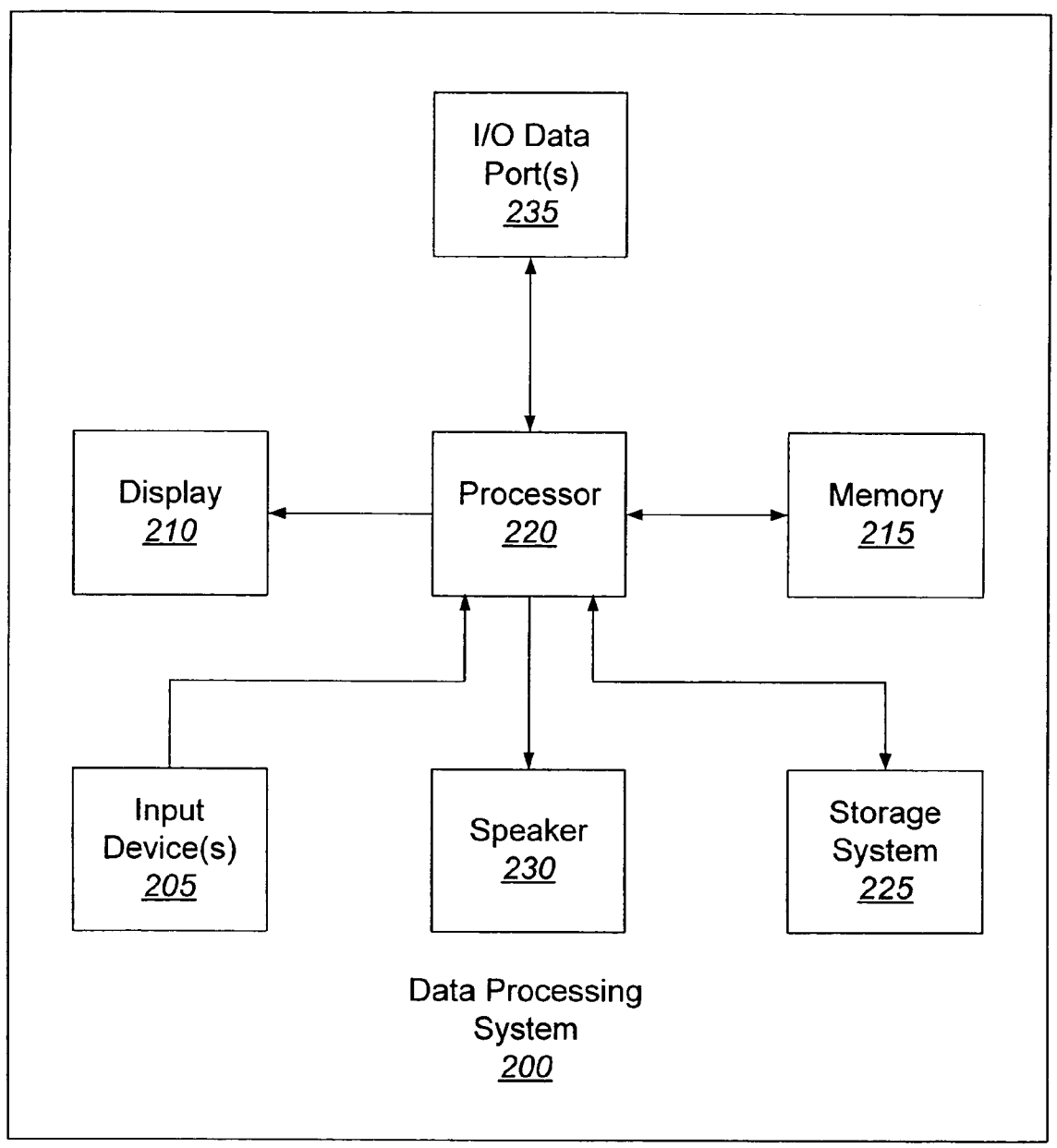
FIG. 2 is a block diagram that illustrates a data processing system in accordance with some embodiments of the present invention.

FIG. 2 illustrates a data processing system 200 that may be used to implement the firewalls 105a,b,c,d, in accordance with some embodiments of the present invention. The data processing system 200 comprises input device(s) 205, such as a keyboard or keypad, a display 210, and a memory 215 that communicate with a processor 220. The data processing system 200 may further comprise a storage system 225, a speaker 230, and an I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art.

Figure 3:
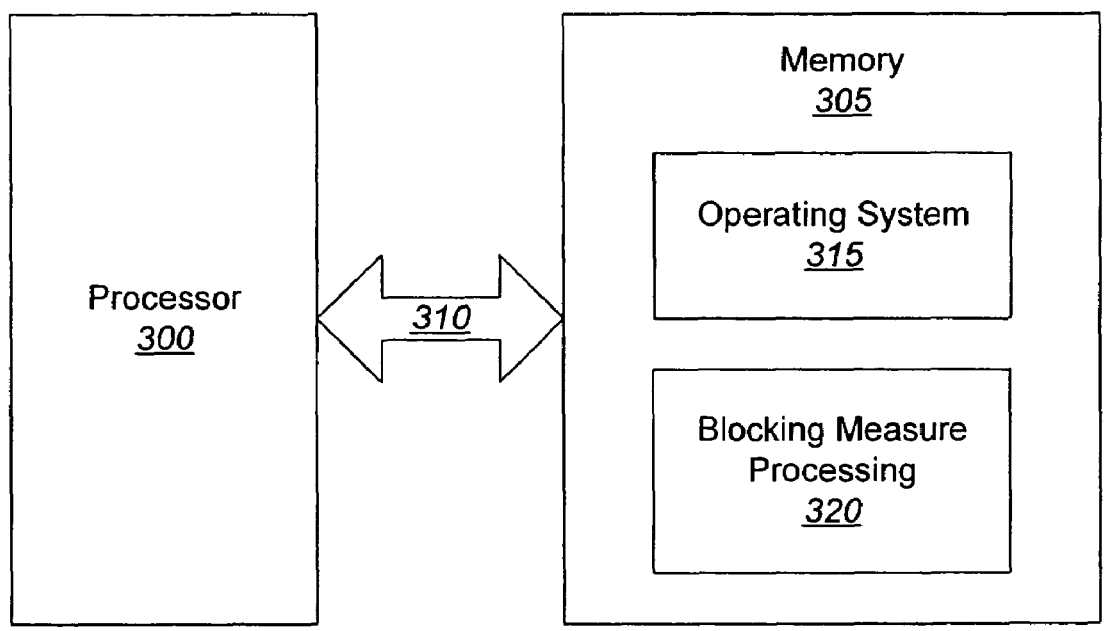
FIG. 3 is a block diagram that illustrates a software/hardware architecture for determining blocking measures for responding to communication traffic anomalies at a network node in accordance with some embodiments of the present invention.

FIG. 3 illustrates a processor 300 and memory 305 that may be used in embodiments of data processing systems, such as the data processing system 200 of FIG. 2 and/or the firewalls 105a,b,c,d of FIG. 1, for determining blocking measures for responding to communication traffic anomalies in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used to facilitate determining blocking measures for processing communication traffic anomalies in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a blocking measure processing module 320. The operating system 315 generally controls the operation of the data processing system. In particular, the operating system 315 may manage the data processing system's software and/or hardware resources and may coordinate execution of programs by the processor 300.

The blocking measure processing module 320 may be configured to determine a set of measures that may be applied to a traffic stream to block or reduce the flow of traffic anomalies while still allowing valid traffic to pass through. Operations for determining these measures will be described in detail hereinafter.

Although FIG. 3 illustrates exemplary hardware/software architectures that may be used in data processing systems, such as the data processing system 200 of FIG. 2 and/or the firewalls 105a,b,c,d of FIG. 1, for managing and/or determining blocking measures for responding to communication traffic anomalies, it will be understood that the present invention is not limited to such a configuration but is intended to encompass any configuration capable of carrying out operations described herein. Moreover, the functionality of the data processing system 200 of FIG. 2, firewalls 105a,b,c,d of FIG. 1, and the hardware/software architecture of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 3 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for managing and/or determining blocking measures for processing communication traffic anomalies, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
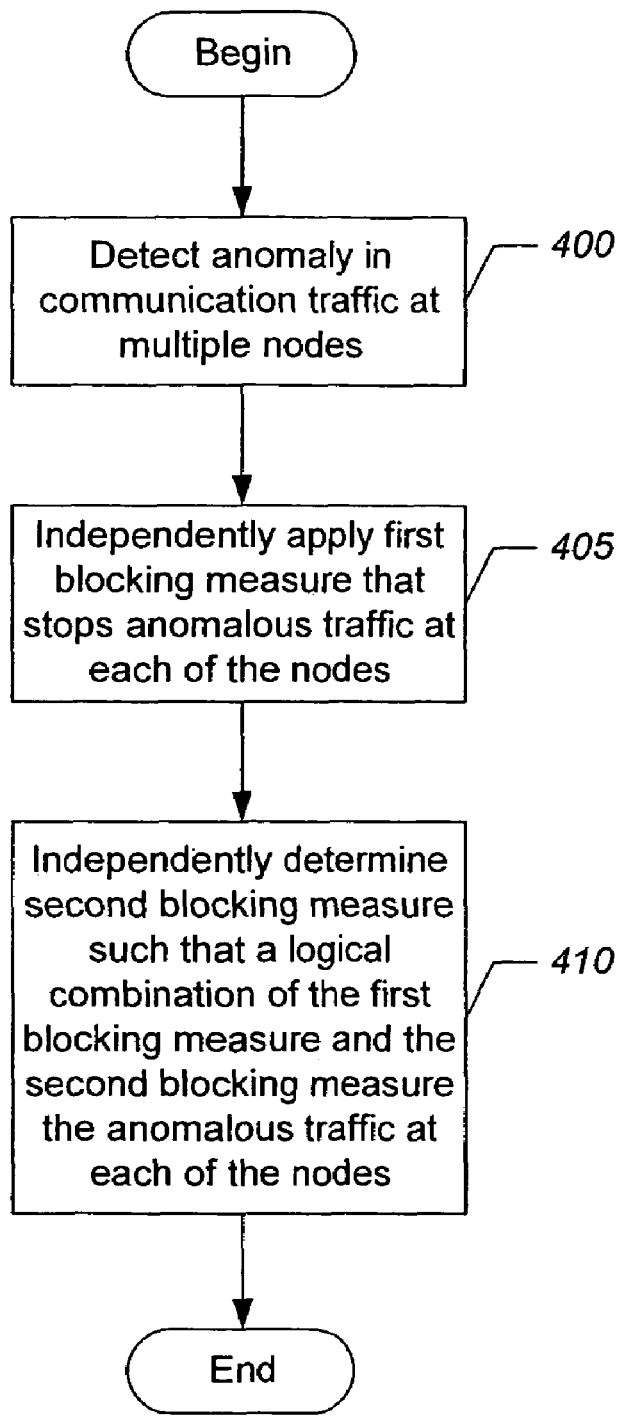
FIGS. 4 and 5 are block diagrams that illustrate operations for determining and managing the use of blocking measures for responding to communication traffic anomalies in accordance with some embodiments of the present invention.

Referring now to FIG. 4, exemplary operations for managing and/or determining blocking measures for processing communication traffic anomalies, in accordance with some embodiments of the present invention, will now be described. Operations begin at block 400 where the blocking measure processing module 320 in multiple nodes, e.g., firewalls 105a,b,c,d in the protected subnet 100 of FIG. 1, may detect an anomaly in communication traffic. The anomaly may be detected by detecting a pattern in a value of one or more protocol fields associated with the communication traffic in accordance with some embodiments of the present invention. Examples of such fields may include, but are not limited to, IP and/or TCP fields, such as IP source address, IP destination address, and TCP destination port. In some embodiments of the present invention, one or more anomaly factors may be defined. For example, one factor may be that the arriving packet destination address values are randomly distributed values within the assigned subnet space, but are not the values appropriate to the machines within the subnet that support the application designated by the destination port. Another factor may be that the rate of packets arriving for the destination port is higher than normal. Thus, different anomalies may be defined as corresponding to different combinations of anomaly factors. The blocking measure processing module 320 in the network nodes or firewalls may compare the communication traffic to these factors and recognize an anomaly if one or more of these factors is/are present. Moreover, to avoid triggering blocking measures for very small bursts of anomalous traffic, the blocking measure processing module 320 may not recognize an anomaly in the communication traffic unless the flow rate of the anomalous traffic exceeds a threshold.

The following operations of blocks 405 and 410 are then performed independently at the respective nodes/firewalls where the anomaly was been detected without the need for decisions by or communication with a central management entity. At block 405, the blocking measure processing module 320 applies a first blocking measure that stops the anomalous traffic. The blocking measure processing module 320 then determines a second blocking measure such that a logical combination of the first blocking measure and the second blocking measure stops the anomalous traffic at block 410. Advantageously, the logical combination of the first and second blocking measures is less restrictive than the first blocking measure alone thereby allowing more valid traffic to pass through the network, e.g., the protected subnet 100 of FIG. 1.

In accordance with some embodiments of the present invention, the blocking measure processing module 320 may assign a severity to detected anomalies. In this regard, a table of anomalies may be formed and, for each anomaly, the anomaly factors that are relevant are identified and the assigned severity is listed.

For more severe anomalies, the blocking measure processing module 320 may use the first blocking measure to stop the anomalous traffic. For less severe anomalies, the blocking measure management module 320 may use the first blocking measure to reduce the flow of the anomalous traffic below a threshold.

Thus, the blocking measure processing modules 320 in the various network nodes/firewalls may allow the network nodes/firewalls to independently determine, without intercommunication, which nodes for which blocking measures may be applied to stop the anomalous traffic. That is, although anomalous traffic may be reported at multiple nodes/firewalls, with the firewalls/nodes acting independently in asynchronous fashion to apply blocking measures to the anomalous traffic, a reduced set of nodes for which blocking measures are applied may be determined and a less restrictive set of blocking measures applied at these nodes may be determined.

Embodiments of the present invention have been described above in which each node/firewall acts independently in asynchronous fashion to determine a set of blocking measure(s) for responding to a communication traffic anomaly. In other embodiments, however, the nodes/firewalls may respond to a communication traffic anomaly in synchronous fashion by sharing blocking measure information directly with each other and/or by sharing blocking measure information with a centralized decision-making management entity.

Figure 5:
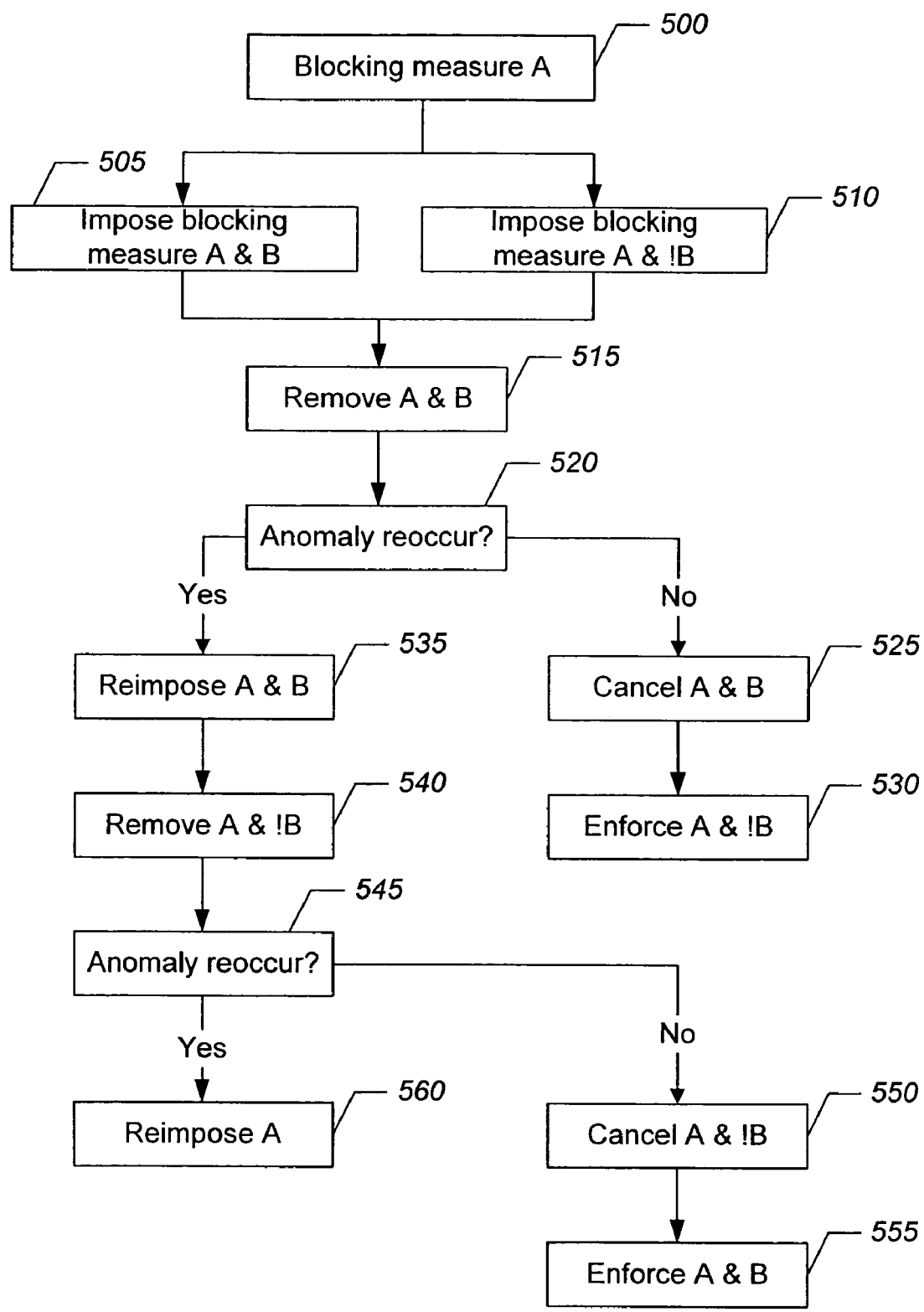

Operations for determining blocking measures for responding to communication traffic anomalies at a node/firewall, in accordance with some embodiments of the present invention, may be illustrated by way of example with reference to FIG. 5. Operations begin at block 500 where the blocking measure processing module 320 imposes a blocking measure A that stops the anomaly in the communication traffic. At blocks 505 and 510, the blocking measure processing module 320 may impose the logical combinations of blocking measures A & B and blocking measures A & !B. For purposes of illustration, the combination of A & B may be considered to be more restrictive than A & !B. Accordingly, the combination of A & B is removed at block 515 and a determination is made at block 520 whether the anomalous traffic reoccurs.

If the anomalous traffic does not reoccur, then the logical combination of blocking measures A & B may be canceled at block 525 and the combination of A & !B may be enforced at 530. If, however, the anomaly reoccurs as determined at block 520, then the blocking measure processing module 320 may impose the logical combination of blocking measures A & B at block 535 and remove the logical combination of blocking measures A & !B at block 540.

If the anomalous traffic does not reoccur as determined at block 545, then the blocking measure processing module 320 may cancel the logical combination of blocking measures A & !B at block 550 and may enforce the logical combination of blocking measures A & B at block 555. If, however, the anomalous traffic does reoccur as determined at block 545, then neither the logical combination of blocking measures A & B nor the logical combination of blocking measures A & !B were able to stop the anomalous traffic. Therefore, the blocking measure processing module 320 re-imposes blocking measure A at block 560. Note that the operations of FIG. 5 may then be repeated to include another blocking measure C whether blocking measures A & B are enforced, blocking measures A & !B are enforced, or blocking measure A is enforced to further reduce the restrictive nature of the blocking measures that are ultimately imposed. This process may be repeated as many times as desired to find a combination of blocking measures that blocks or reduces the flow or valid traffic to an acceptable level. Moreover, in accordance with some embodiments of the present invention, the operations for selecting a combination of blocking measures may start based on a combination rather than a single blocking measure if the blocking measure processing module 320 has information indicating that a particular combination of blocking measures may be effective for a particular type of traffic anomaly.

The following algorithm may be used to determine a combination of blocking measures B0 and B1, which may be assumed that at least one of which is effective at blocking an anomaly in a communication traffic stream. If an anomaly packet occurs in a time interval [t−Δt, t), then A(t)=true, else A(t)=false. If the blocking measure B0 is enforced during time interval [t−Δt, t), the B0(t)=true, else B0(t)=false. Similarly for B1(t). A timestamp TS(t) is equal to the current time or its previous value. A count C0(t) is used to update B0(t) and has an upper limit of L0. Likewise, C1(t) is used to update B1(t) and has an upper limit of L1. The period that B0 and/or B1 is applied can increase if the anomalous traffic persists. Parameters used as base period BP0 and multiplier Mult0 for B0 and BP1 and Mult1 for B1. N0 is true if blocking measure B0 is necessary, otherwise N0=false. N1 is true if blocking measure B1 is necessary, otherwise N1 is false.

If both blocking measures are necessary to stop penetration of the anomalous traffic, then there may be a number X of timesteps and a threshold Th such that if the X+1 most recent penetration measurements (each 0 or 1) add to more than Th, then both B0 and B1 are enforced. If an attack of anomalous traffic occurs in one time interval [t−Δt, t) and is not blocked, then in the next time interval [t, t+Δt) the value of penetration P(t) is true. B0(t+Δt) and B1(t+Δt) may be expressed as follows in accordance with particular embodiments of the present invention:

$$B0(t+\Delta t)=P(t+\Delta t)\&!B0(t)\&!(B1(t-\Delta t)\&B1(t-2\Delta t))|(!P(t+\Delta t)|B0(t)) \& \text{IF } (t+\Delta t-TS(t))<(Mult0^{(Cnt0(t)-1)}*BP0, \text{ then } 1, \text{ else } 0)|\text{IF } (\text{sum}(P(t-X*Dt), P(t))>Th, \text{ then } 1, \text{ else } 0);$$

$$B1(t+\Delta t)=P(t+\Delta t)\&!B1(t)\&!(B0(t-\Delta t)\&B0(t-2\Delta t))|(!P(t+\Delta t)|B1(t)) \& \text{IF } (t+\Delta t-TS(t))<(Mult1^{(Cnt1(t)-1)}*BP1, \text{ then } 1, \text{ else } 0)|\text{IF } (\text{sum}(P(t-X*Dt), P(t))>Th, \text{ then } 1, \text{ else } 0); \text{ where}$$

$$P(t+\Delta t)=A(t) \& ((N0\&!B0(t))|(N1\&!B1(t)));$$

$$TS(t+\Delta t)=TS(t)+\text{IF}(P(t+\Delta t) \& !P(t), \text{ then } t+\Delta t-TS(t), \text{ else } 0);$$

$$C0(t+\Delta t)=\min \{L0, P(t+\Delta t)\&!B0(t)*(C0(t)+1)+!P(t+\Delta t)\&B0(t)*C0(t)\}; \text{ and}$$

$$C1(t+\Delta t)=\min \{L1, P(t+\Delta t)\&!B1(t)*(C1(t)+1)+!P(t+\Delta t)\&B1(t)*C1(t)\}.$$

Advantageously, the determination of blocking measures for operating a communication network, in accordance with some embodiments of the present invention, may be used to test the readiness of a communication network to respond to communication traffic anomalies. For example, one or more anomalies may be inserted into the communication traffic to ensure that the operations described above with respect to FIGS. 4 and 5 are able to respond to and stop or sufficiently suppress the flow rate of the anomaly so that operations of the communication network are not adversely affected. Moreover, the blocking measures determined for an actual anomaly and/or anomalies intentionally inserted during test operations may be stored at a node/firewall such that an association is formed between the particular anomalies, the blocking measures that have been determined to be effective therefore. In some embodiments of the present invention, when an anomaly is detected by the blocking measure processing module 320 at one or more nodes in the communication network, the blocking measure processing module 320 may select a particular blocking measure that has been determined to be effective in stopping or suppressing the flow rate of this particular anomaly.

The flowcharts of FIGS. 4 and 5 illustrate the architecture, functionality, and operations of some embodiments of methods, systems, and computer program products for determining blocking measures for responding to communication traffic anomalies. In this regard, each block represents a module, segment, or portion of code, which comprises one or more executable instructions for implementing the specified logical function(s). It should also be noted that in other implementations, the function(s) noted in the blocks may occur out of the order noted in FIGS. 4 and/or 5. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of operating a communication network, comprising:
   autonomously monitoring communication traffic at a communication port for an anomalous traffic;
   detecting an anomaly in communication traffic at a plurality of nodes in the communication network, wherein the anomaly is an attack other than a worm or virus; independently applying, at respective ones of the plurality of nodes, a first blocking measure A to the anomalous traffic that stops the anomalous traffic;
   independently determining, at the respective ones of the plurality of nodes, a second blocking measure B such that application of a logical combination of the first blocking measure A and the second blocking measure B stops the anomalous traffic;
   applying a logical combination of A and the second blocking measure B given by (A & !B) to the anomalous traffic, wherein the logical combination (A & !B) is a less restrictive blocking measure than a logical combination (A & B); and enforcing the logical combination (A & !B), if the logical combination (A & !B) stops the anomalous traffic.

2. The method of claim 1, further comprising:
   independently determining a third blocking measure C, at the respective ones of the plurality of nodes, such that application of a logical combination of (A & !B) and the third blocking measure C to the anomalous traffic stops the anomalous traffic, if the logical combination (A & !B) stops the anomalous traffic.

3. The method of claim 1, wherein independently determining the second blocking measure B further comprises: applying a logical combination (A & B) to the anomalous traffic if the logical combination (A & !B) does not stop the anomalous traffic; and enforcing the logical combination (A & B), if the logical combination (A & B) stops the anomalous traffic.

4. The method of claim 3, further comprising:
   independently determining a third blocking measure C, at the respective ones of the plurality of nodes, such that application of a logical combination of (A & B) and the third blocking measure C to the anomalous traffic stops the anomalous traffic, if the logical combination (A & B) stops the anomalous traffic.

5. The method of claim 3, further comprising:
   determining a third blocking measure C, at the respective ones of the plurality of nodes, such that application of a logical combination of A and the third blocking measure C to the anomalous traffic stops the anomalous traffic, if the logical combination (A & B) does not stop the anomalous traffic.

6. The method of claim 1, wherein detecting an anomaly in the communication traffic comprises:
   comparing the communication traffic to at least one anomaly factor; and
   detecting the anomaly in the communication traffic at the plurality of nodes in the communication network if the at least one anomaly factor is present in the communication traffic.

7. The method of claim 1, further comprising:
   assigning a severity to the detected anomaly; and
   wherein independently applying the first blocking measure A to the anomalous traffic comprises independently applying the first blocking measure A to the anomalous traffic at each of the plurality of nodes in the communication network that stops or reduces the flow of the anomalous traffic based on the severity of the detected anomaly.

8. The method of claim 1, further comprising:
   intentionally inserting the anomaly in the communication traffic; and
   associating the first blocking measure A and the second blocking measure B with the anomaly.

9. A method of operating a communication network, comprising:
   detecting an anomaly in communication traffic at a plurality of nodes in the communication network;
   synchronously applying, at respective ones of the plurality of nodes, a first blocking measure A to the anomalous traffic that stops the anomalous traffic;
   synchronously determining, at the respective ones of the plurality of nodes, a second blocking measure B such that application of a logical combination of the first blocking measure A and the second blocking measure B stops the anomalous traffic;
   applying a logical combination of A and the second blocking measure B given by (A & !B) to the anomalous traffic, wherein the logical combination (A & !B) is a less restrictive blocking measure than a logical combination (A & B); and enforcing the logical combination (A & !B), if the logical combination (A & !B) stops the anomalous traffic.

10. A system for operating a communication network, comprising:
    a processor;
    program means executing on the processor including:
    means for autonomously monitoring communication traffic at a communication port for an anomalous traffic;
    means for detecting an anomaly in communication traffic at a plurality of nodes in the communication network, wherein the anomaly is an attack other than a worm or virus;
    means for independently applying, at respective ones of the plurality of nodes, a first blocking measure A to the anomalous traffic that stops the anomalous traffic;
    means for independently determining, at the respective ones of the plurality of nodes a, second blocking measure B such that application of a logical combination of the first blocking measure A and the second blocking measure B stops the anomalous traffic;
    means for applying a logical combination of A and the second blocking measure B given by (A & !B) to the anomalous traffic, wherein the logical combination (A & !B) is a less restrictive blocking measure than a logical combination (A & B); and means for enforcing the logical combination (A & !B), if the logical combination (A & !B) stops the anomalous traffic.

11. The system of claim 10, further comprising:
means for independently determining, at the respective ones of the plurality of nodes, a third blocking measure C such that application of a logical combination of (A & !B) and the third blocking measure C to the anomalous traffic stops the anomalous traffic, if the logical combination (A & !B) stops the anomalous traffic.

12. The system of claim 10, wherein the means for independently determining the second blocking measure B further comprises:
means for applying a logical combination (A & B) to the anomalous traffic if the logical combination (A & !B) does not stop the anomalous traffic; and
means for enforcing the logical combination (A & B), if the logical combination (A & B) stops the anomalous traffic.

13. The system of claim 12, further comprising:
means for independently determining, at the respective ones of the plurality of nodes, a third blocking measure C such that application of a logical combination of (A & B) and the third blocking measure C to the anomalous traffic stops the anomalous traffic, if the logical combination (A & B) does not stop the anomalous traffic.

14. The system of claim 12, further comprising:
means for determining, at the respective ones of the plurality of nodes, a third blocking measure C such that application of a logical combination of A and the third blocking measure C to the anomalous traffic stops the anomalous traffic, if the logical combination (A & B) does not stop the anomalous traffic.

15. The system of claim 10, wherein the means for detecting an anomaly in the communication traffic comprises:
means for comparing the communication traffic to at least one anomaly factor; and
means for detecting the anomaly in the communication traffic at the plurality of nodes in the communication network, if the at least one anomaly factor is present in the communication traffic.

16. The system of claim 10, further comprising:
means for assigning a severity to the detected anomaly; and
wherein the means for independently applying the first blocking measure A to the anomalous traffic comprises means for independently applying the first blocking measure A to the anomalous traffic at each of the plurality of nodes in the communication network that stops or reduces the flow of the anomalous traffic based on the severity of the detected anomaly.

17. The system of claim 10, further comprising:
means for intentionally inserting the anomaly in the communication traffic; and
means for associating the first blocking measure A and the second blocking measure B with the anomaly.

18. A system for operating a communication network, comprising:
means for detecting an anomaly in communication traffic at a plurality of nodes in the communication network;
means for synchronously applying, at respective ones of the plurality of nodes, a first blocking measure A to the anomalous traffic that stops the anomalous traffic;
means for synchronously determining a second blocking measure B at the respective ones of the plurality of nodes such that application of a logical combination of the first blocking measure A and the second blocking measure B stops the anomalous traffic;
means for applying a logical combination of A and the second blocking measure B given by (A & !B) to the anomalous traffic, wherein the logical combination (A & !B) is a less restrictive blocking measure than a logical combination (A & B); and means for enforcing the logical combination (A & !B), if the logical combination (A & !B) stops the anomalous traffic.

19. A computer program product for operating a communication network, comprising:
a tangible computer storage medium having computer readable program code embodied therein, the computer readable program code comprising:
computer readable program code configured to autonomously monitor communication traffic at a communication port for an anomalous traffic;
computer readable program code configured to detect an anomaly in communication traffic at a plurality of nodes in the communication network, wherein the anomaly is an attack other than a worm or virus;
computer readable program code configured to independently apply, at respective ones of the plurality of nodes, a first blocking measure A to the anomalous traffic that stops the anomalous traffic;
computer readable program code configured to independently determine at the respective ones of the plurality of nodes a second blocking measure B such that application of a logical combination of the first blocking measure A and the second blocking measure B stops the anomalous traffic;
computer readable program code configured to apply a logical combination of A and the second blocking measure B given by (A & !B) to the anomalous traffic, wherein the logical combination (A & !B) is a less restrictive blocking measure than a logical combination (A & B); and computer readable program code configured to enforce the logical combination (A & !B), if the logical combination (A & !B) stops the anomalous traffic.

20. The computer program product of claim 19, further comprising:
computer readable program code configured to independently determine, at the respective ones of the plurality of nodes, a third blocking measure C such that application of a logical combination of (A & !B) and the third blocking measure C to the anomalous traffic stops the anomalous traffic if the logical combination (A & !B) stops the anomalous traffic.

21. The computer program product of claim 19, wherein the computer readable program code configured to independently determine the second blocking measure B further comprises:
computer readable program code configured to apply a logical combination (A & B) to the anomalous traffic if the logical combination (A & !B) does not stop the anomalous traffic; and
computer readable program code configured to enforce the logical combination (A & B), if the logical combination (A & B) stops the anomalous traffic.

22. The computer program product of claim 21, further comprising:
computer readable program code configured to independently determine, at the respective ones of the plurality of nodes, a third blocking measure C such that application of a logical combination of (A & B) and the third blocking measure C to the anomalous traffic stops the anomalous traffic, if the logical combination (A & B) stops the anomalous traffic.

23. The computer program product of claim 21, further comprising:

computer readable program code configured to determine, at the respective ones of the plurality of nodes, a third blocking measure C such that application of a logical combination of A and the third blocking measure C to the anomalous traffic stops the anomalous traffic, if the logical combination (A & B) does not stop the anomalous traffic.

24. The computer program product of claim 19, wherein the computer readable program code configured to detect an anomaly in the communication traffic comprises:

computer readable program code configured to compare the communication traffic to at least one anomaly factor; and computer readable program code configured to detect the anomaly in the communication traffic at the plurality of nodes in the communication network, if the at least one anomaly factor is present in the communication traffic.

25. The computer program product of claim 19, further comprising:

computer readable program code configured to assign a severity to the detected anomaly; and wherein the computer readable program code configured to independently apply the first blocking measure A to the anomalous traffic comprises computer readable program code configured to independently apply the first blocking measure A to the anomalous traffic at each of the plurality of nodes in the communication network that stops or reduces the flow of the anomalous traffic based on the severity of the detected anomaly.

26. The computer program product of claim 19, further comprising:

computer readable program code configured to intentionally insert the anomaly in the communication traffic; and computer readable program code configured to associate the first blocking measure A and the second blocking measure B with the anomaly.

27. A computer program product for operating a communication network, comprising:

a tangible computer storage medium having computer readable program code embodied therein, the computer readable program code comprising:

computer readable program code configured to detect an anomaly in communication traffic at a plurality of nodes in the communication network;

computer readable program code configured to synchronously apply, at respective ones of the plurality of nodes, a first blocking measure A to the anomalous traffic that stops the anomalous traffic;

computer readable program code configured to synchronously determine at the respective ones of the plurality of nodes a second blocking measure B such that application of a logical combination of the first blocking measure A and the second blocking measure B stops the anomalous traffic;

computer readable program code configured to apply a logical combination of A and the second blocking measure B given by (A & !B) to the anomalous traffic, wherein the logical combination (A & !B) is a less restrictive blocking measure than a logical combination (A & B); and computer readable program code configured to enforce the logical combination (A & !B), if the logical combination (A & !B) stops the anomalous traffic.

* * * * *

UNITED STATES PATENT AND TRADEMARK OFFICE
CERTIFICATE OF CORRECTION

PATENT NO. : 7,594,263 B2
APPLICATION NO. : 10/774017
DATED : September 22, 2009
INVENTOR(S) : Boulanger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1629 days.

Signed and Sealed this

Twenty-eighth Day of September, 2010

David J. Kappos
*Director of the United States Patent and Trademark Office*